(12) United States Patent
Balliew

(10) Patent No.: US 8,112,855 B1
(45) Date of Patent: Feb. 14, 2012

(54) TOOL FOR THE REMOVAL AND REASSEMBLY OF CYLINDER VALVE CAPS

(76) Inventor: James W. Balliew, Ben Franklin, TX (US)

( * ) Notice: Subject to any disclaimer, the term of this patent is extended or adjusted under 35 U.S.C. 154(b) by 424 days.

(21) Appl. No.: 12/429,722

(22) Filed: Apr. 24, 2009

(51) Int. Cl.
*B23P 19/04* (2006.01)
*F16B 21/00* (2006.01)

(52) U.S. Cl. ........................ 29/221.6; 411/340
(58) Field of Classification Search ............ 29/221.6, 29/213.1, 284; 411/340
See application file for complete search history.

(56) References Cited

U.S. PATENT DOCUMENTS

| | | | |
|---|---|---|---|
| 1,075,759 A * | 10/1913 | Burridge | 411/345 |
| 1,346,578 A | 7/1920 | Windsor | |
| 2,578,515 A | 12/1951 | Crafton | |
| 3,861,268 A * | 1/1975 | Jaggers | 411/340 |
| 4,196,883 A | 4/1980 | Einhorn et al. | |
| 5,156,482 A | 10/1992 | Owings | |
| 5,215,418 A | 6/1993 | Trainer et al. | |
| 5,507,611 A | 4/1996 | Collister | |
| 5,803,688 A | 9/1998 | Gleason et al. | |
| 5,897,300 A | 4/1999 | Luedtke | |
| 5,904,462 A * | 5/1999 | Gonzalez | 411/342 |
| 6,685,408 B1 | 2/2004 | Fusco | |
| 2009/0003962 A1 | 1/2009 | McDuff et al. | |

* cited by examiner

*Primary Examiner* — David B Thomas
(74) *Attorney, Agent, or Firm* — Locke Lord, LLP

(57) ABSTRACT

A tool to assist in the removal and reassembly of a valve cap, to a cylinder includes a shaft. The first end of the shaft includes a support surface. The second end of the shaft includes threads for selectively engaging one of the threaded apertures contained in the cylinder upon removal of one of the plurality of cap bolts. The shaft is insertable through a valve cap aperture and is attachable to the cylinder, such that the support surface supports the valve cap when the valve cap is removed from the cylinder. The shaft includes a slot. A toggle is pivotally mounted within the slot and rotatable between a retracted position wherein the toggle is contained within the shaft and an extended position wherein the toggle extends beyond the shaft. The toggle is positioned in the retracted position to allow the valve cap to slide past the slot. The toggle in the extended position engages the valve cap to thereby support the valve cap during reassembly of the valve cap to the cylinder.

6 Claims, 4 Drawing Sheets

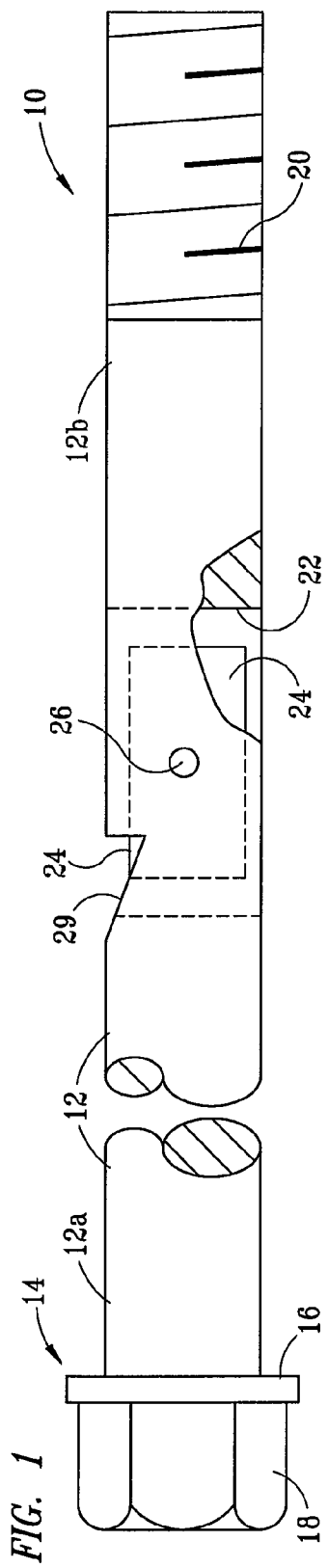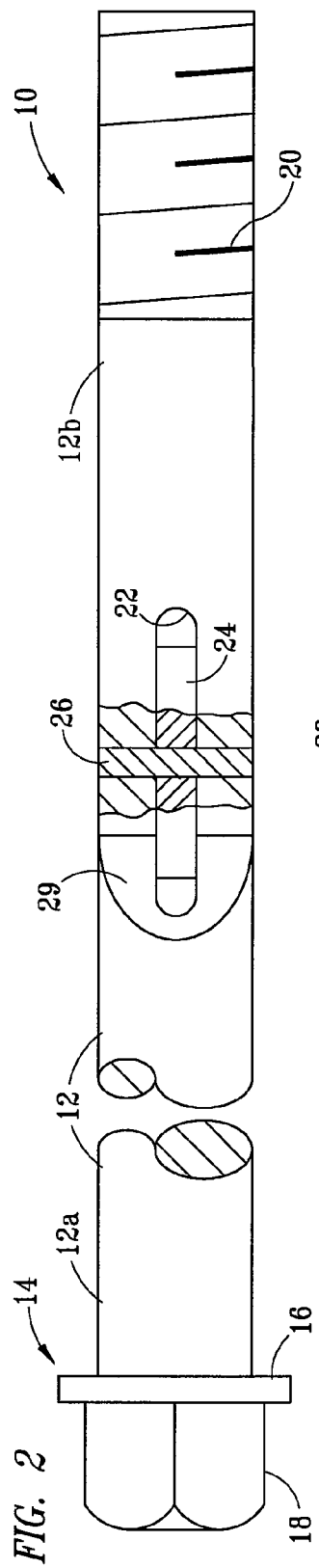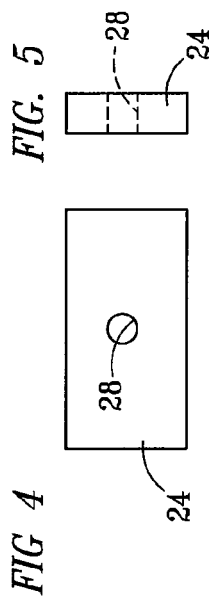

TOOL FOR THE REMOVAL AND REASSEMBLY OF CYLINDER VALVE CAPS

TECHNICAL FIELD OF THE INVENTION

The present invention relates to mechanical tools, and more particularly to a tool for assisting with the removal and reassembly of compressor valve caps.

BACKGROUND ART OF THE INVENTION

Ariel compressors for use with various types of engines, include a number of suction valves and discharge valves. These valves are housed within cylinders which are closed by a valve cap. Typically, a valve cap is attached to the cylinder utilizing eight bolts. The cap may weigh, for example, seventy pounds and must be removed in order to remove the valve and chair from the cylinder.

The removal of the valve cap is a difficult procedure and may be unsafe for one person to attempt. Once the bolts have been removed, the cap must be set aside. After the valve is replaced, the cap must be held in place, realigned with the cylinder and then the individual bolts installed while the cap is held in place in order to reassemble the cap to the cylinder.

A need has thus arisen for a tool to assist with the removal and reassembly of compressor valve caps where the cap can be handled safely, efficiently and by one person.

SUMMARY OF THE INVENTION

In accordance with the present invention, a tool is provided to assist in the removal and reassembly of a valve cap, normally attached to a cylinder, the valve cap including a plurality of apertures for receiving a plurality of cap bolts threadedly received in a plurality of threaded apertures contained in the cylinder. The tool includes a shaft having first and second ends. The first end of the shaft includes a support surface. The second end of the shaft includes threads for selectively engaging one of the threaded apertures contained in the cylinder upon removal of one of the plurality of cap bolts. The shaft is insertable through a valve cap aperture and is attachable to the cylinder, such that the support surface supports the valve cap when the valve cap is removed from the cylinder. The shaft includes a slot disposed between the first and second ends. A toggle is pivotally mounted within the slot and rotatable between a retracted position wherein the toggle is contained within the shaft and an extended position wherein the toggle extends beyond the shaft. The toggle is positioned in the retracted position to allow the valve cap to slide past the slot. The toggle in the extended position engages the valve cap to thereby support the valve cap during insertion of the cap bolts through the valve cap apertures for reattachment of the valve cap bolts to the cylinder apertures.

BRIEF DESCRIPTION OF THE DRAWINGS

For a more complete understanding of the present invention and for further advantages thereof, reference is now made to the following description taken in conjunction with the accompanying drawings in which:

FIG. 1 is a side elevational view of the present tool;
FIG. 2 is a top plan view of the present tool shown in FIG. 1;
FIG. 3 is a side elevational view of the present toggle;
FIG. 4 is a top plan view of the present toggle;
FIG. 5 is an end view of the present toggle.

DESCRIPTION OF THE PREFERRED EMBODIMENT

Figure 6:
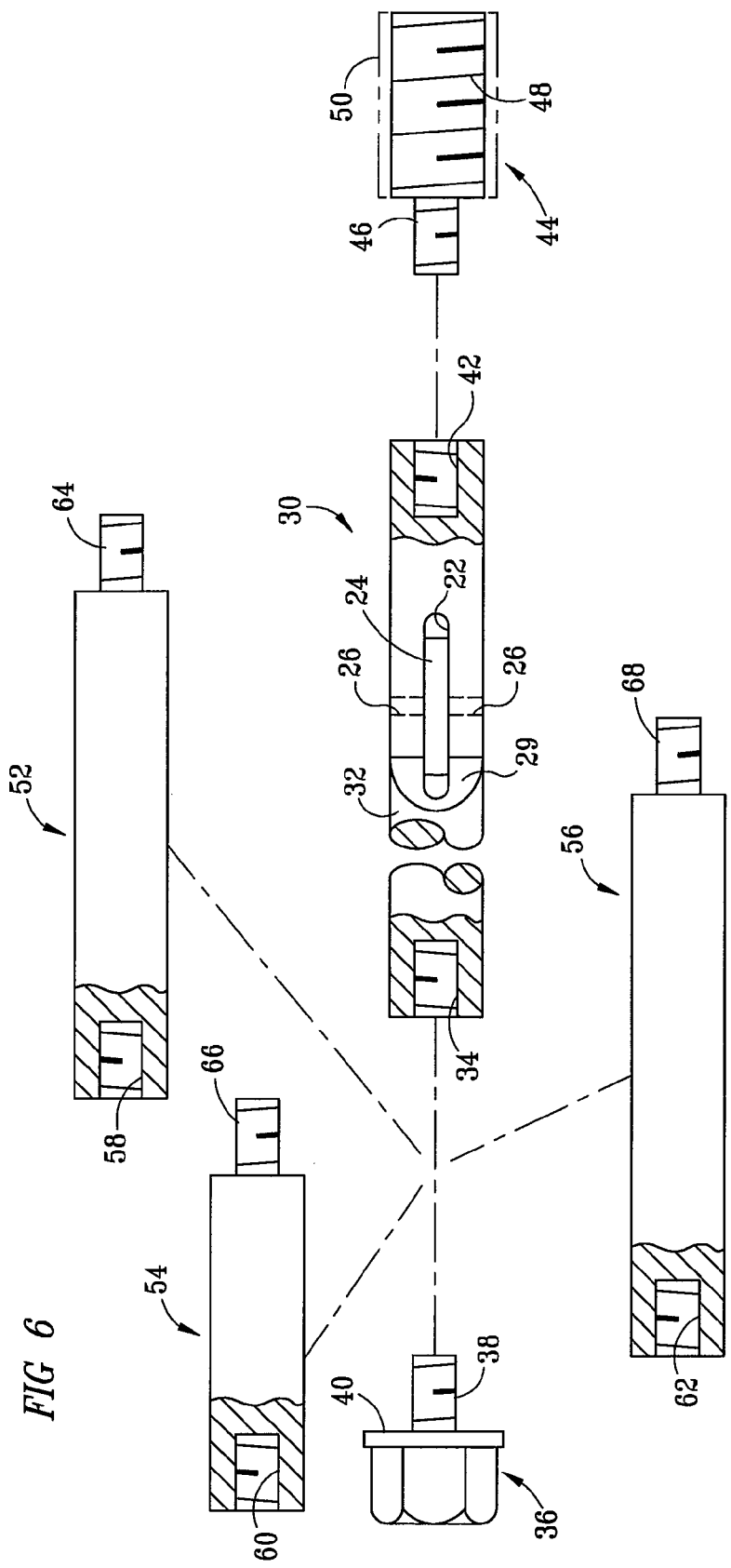
FIG. 6 is an exploded side view of an additional embodiment of the present tool.

Referring simultaneously to FIGS. 1 and 2, the present tool is illustrated, and is generally identified by the numeral 10. Tool 10 includes a shaft 12 having a first end 12a and a second end 12b. Shaft 12 is comprised of, for example, a shaft of twenty inches long and one inch in diameter.

Attached to end 12a of shaft 12 is a support surface, generally identified by the numeral 14. Support surface 14 may comprise, for example, a nut 18 having a shoulder 16.

End 12b of shaft 12 includes threads 20.

Figure 7:
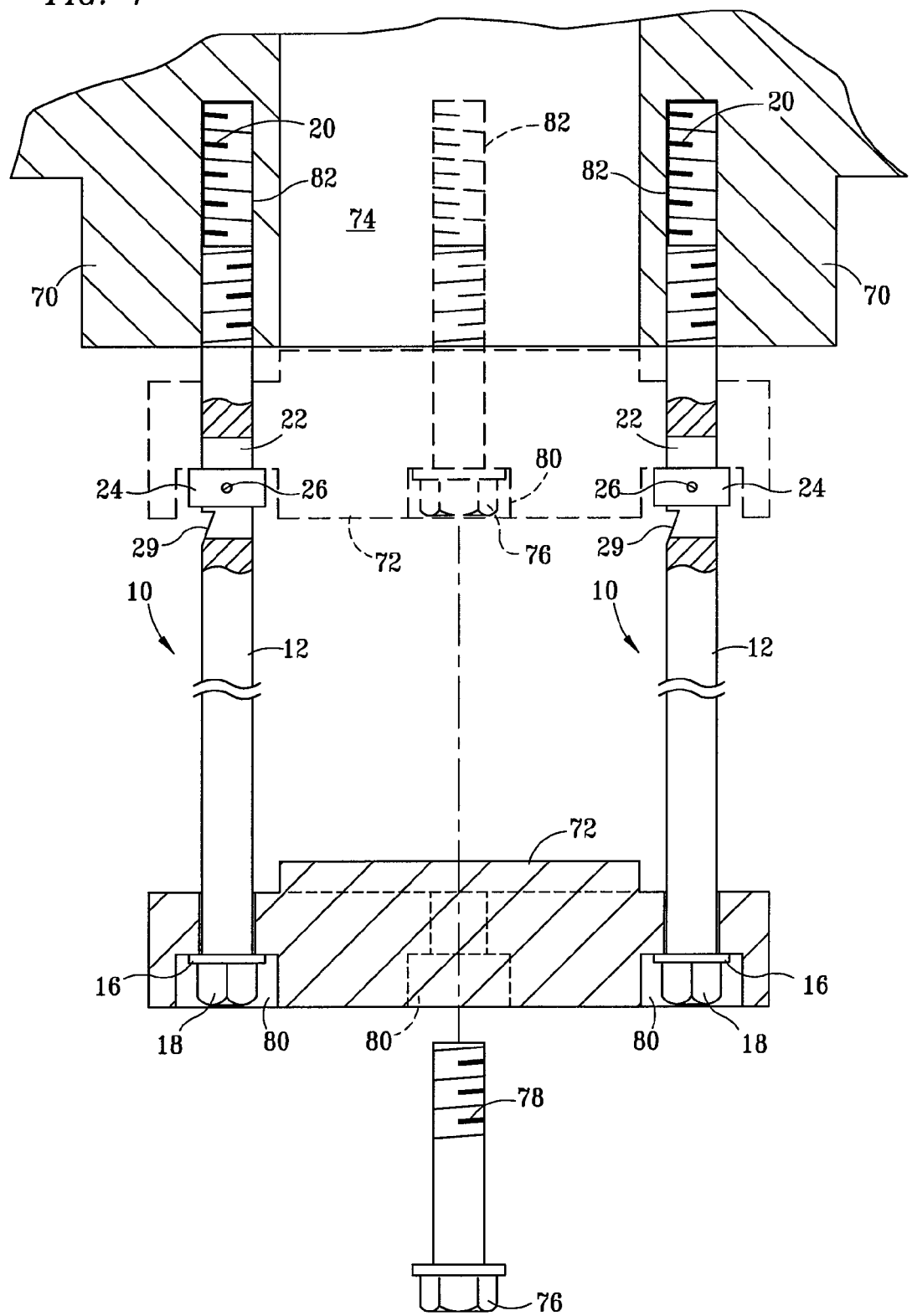
FIG. 7 is a side elevational view, partially in section of a valve cap in two positions relative to a cylinder.

Disposed between ends 12a and 12b of shaft 12 is a slot 22. Disposed within slot 22 is a toggle 24. Toggle 24 is mounted within slot 22 utilizing a pin 26 which passes through an aperture 28 within toggle 24. FIGS. 3, 4, and 5 illustrate toggle 24 removed from slot 22. Toggle 24 is typically mounted within slot 22 utilizing pin 26 and moves between a retracted position as illustrated in FIGS. 1 and 2 and an extended position extending beyond shaft 12 as illustrated in FIG. 7.

A notch 29 is provided adjacent to toggle 24. Notch 29 allows a user to contact toggle 24 when retracted within shaft 12 and to cause toggle 24 to move to the extended position, outwardly of shaft 12.

Referring now to FIG. 6, an additional embodiment of the present tool is illustrated, and is generally identified by the numeral 30. Tool 30 includes multiple extension sections and a removable front tip. The removable front tip accommodates different thread configurations as well as different outside diameters to allow the present tool to be utilized with cylinders of various configurations.

Tool 30 includes a main section 32 which includes slot 22. Slot 22 includes toggle 24 mounted by a pin 26 as previously described with respect to tool 10. Section 32 includes a threaded recess 34 which mates with a nut, generally identified by the numeral 36 having a threaded shaft 38. Nut 36 includes a support surface 40.

Main section 32 also includes a threaded recess 42 which mates with a removable front tip, generally identified by the numeral 44. Tip 44 includes a threaded shaft 46 which engages main section 32 of tool 30. Front tip 44 includes threads 48 and an outside diameter 50.

The length of tool 30 is determined by the number of sections disposed between main section 32 and nut 36 by including one or more sections, generally identified by the numerals 52, 54 and 56. Section 52 includes a threaded recess 58 and a threaded shaft 64. Shaft 64 engages threaded recess 34 of main section 32 and threaded recess 58 engages shaft 38 of nut 36 to complete tool 30. If additional length is desired for tool 30, section 54 is insertable between section 52 and nut 36. Section 54 includes a threaded recess 60 and a threaded shaft 66. Similarly, section 56 includes a threaded recess 62 and a threaded shaft 68. The maximum length of tool 30 combines main section 32 with sections 52, 54 and 56 interconnected via respective threaded recesses 34, 58, 60 and 62 and threaded shafts 38, 64, 66 and 68.

Figure 8:
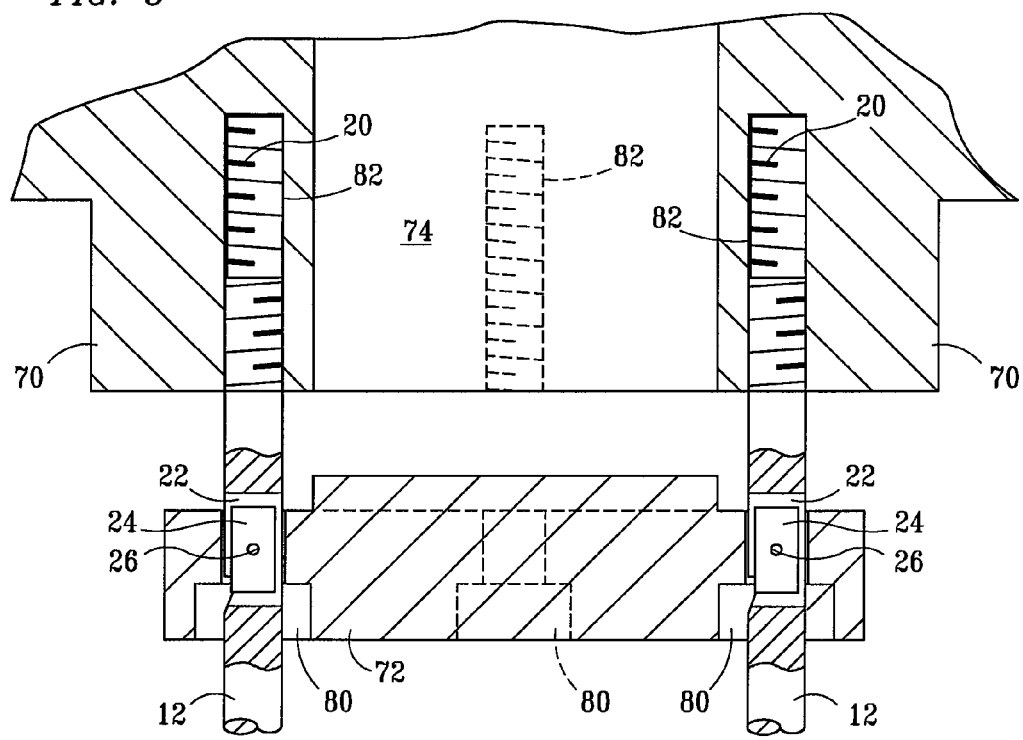
FIG. 8 is a side elevational view, partially in section of a valve cap and cylinder.

Referring now simultaneously FIGS. 7 and 8, the present tool 10 is shown for use with a cylinder 70 and a valve cap 72. Cylinder 70 includes a chamber 74 which houses a valve and chair (not shown). Bolts 76 are utilized for attaching valve cap 72 to cylinder 70. Typically eight bolts 76 are utilized which are circumferentially disposed around chamber 74 of cylinder 70. Bolts 76 include threads 78. Bolts 76 pass through an aperture 80 contained within valve cap 72. Thread 78 of bolt 76 engage threaded aperture 82 contained within cylinder 70.

FIGS. 7 and 8 illustrate the use of two tools 10 to assist in the removal and reassembly of valve cap 72. Two bolts 76 are removed from apertures 80 of valve cap 72 and replaced by the two tools 10. Threads 20 of tools 10 engage threaded apertures 82 of cylinder 70 after passing through apertures 80 of valve cap 72. As illustrated in FIG. 7, two tools 10 have been installed to cylinder 70. The remaining bolts, for example, six bolts 76 are then loosened and removed in order to break the O-ring seal between valve cap 72 and cylinder 70. As illustrated in FIG. 8, after all bolts 76 are removed valve cap 72 is then moved downwardly past slot 22 of shaft 12 with toggle 24 disposed within slot 22. Valve cap 72 moves downwardly until engagement with shoulder 16 of nut 18. Shoulder 16 thereby supports valve cap 72 while valve cap 72 is disengaged from cylinder 70. Tools 10 maintain the alignment of apertures 80 within valve cap 72 to threaded apertures 82 within cylinder 70 for subsequent reattachment of valve cap 72 to cylinder 70.

After the valve and chair have been reinstalled within chamber 74 of cylinder 70, valve cap 72 is moved to the position illustrated in FIG. 7 in dotted lines adjacent to cylinder 70. Toggle 24 is then moved to the extended position, extending from slot 22 of shaft 12 to thereby support valve cap 72 adjacent to cylinder 70 while bolts 76 are reinserted through apertures 80 of valve cap 72 for attachment to cylinder 70. Since tools 10 have maintained alignment between apertures 80 of valve cap 72 and threaded apertures 82 of cylinder 70, bolts 76 can be easily inserted. Once six bolts 76 have been installed, tools 10 can be removed from cylinder 70, and the remaining two bolts 76 can be installed in place of tools 10. Valve cap 72 has then been completely reassembled to cylinder 70 with minimal effort and in a safe manner. Valve cap 72 is always maintained in alignment with cylinder 70 through the use of tools 10 even when valve cap 72 is disconnected from cylinder 70. Additionally, with the use of support structure 14 of shaft 12, and toggle 24, valve cap 72 is always supported, thereby eliminating the need for multiple persons to support valve cap 72 when detached from cylinder 70.

I claim:

1. A tool useful during the removal of a valve cap from and during the reassembly of a valve cap to a cylinder, the valve cap and cylinder each including a plurality of circumferentially disposed apertures for receiving a plurality of cap bolts that threadedly attach the valve cap to the cylinder, with the valve cap apertures being unthreaded and the cylinder apertures being threaded, the tool comprising:
   - a shaft having first and second ends and an adjustable length between the first and second ends, said first end including a support surface having a shoulder facing said second end and said second end being insertable through one of the plurality of valve cap apertures and including threads for selectively engaging an aligned threaded aperture of the cylinder upon removal of one of the plurality of cap bolts,
   - wherein said support surface supports the valve cap on the shaft when the valve cap is removed from the cylinder and maintains alignment between the valve cap aperture and the threaded aperture of the cylinder;
   - said shaft including a slot disposed between said first and second ends thereof;
   - a toggle pivotally mounted within said slot and rotatable between a retracted position wherein said toggle is contained within said shaft and an extended position wherein said toggle extends beyond said shaft;
   - said toggle in said retracted position allowing the valve cap to slide past said slot; and
   - said toggle in said extended position engaging the valve cap to thereby support the valve cap during reassembly of the valve cap to the cylinder.

2. The tool of claim 1 wherein said shaft includes a plurality of coaxially aligned sections for use in selectively adjusting the length between said first and second ends thereof.

3. The tool of claim 1 wherein said shaft second end includes a removable front tip section for selectively attaching said shaft to cylinder apertures having different thread configurations.

4. The tool of claim 1 wherein said shaft second end includes a removable front tip section for selectively attaching said shaft to cylinder apertures having different outside diameters.

5. The tool of claim 1 wherein said support surface includes a bolt having a shoulder.

6. The tool of claim 1 wherein the cylinder is a compressor cylinder.

\* \* \* \* \*